(12) United States Patent
Knowles

(10) Patent No.: US 10,638,343 B2
(45) Date of Patent: *Apr. 28, 2020

(54) PROXIMITY DETECTION

(71) Applicant: Imagination Technologies Limited, Kings Langley (GB)

(72) Inventor: Ian Knowles, Burnham (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/988,811

(22) Filed: May 24, 2018

(65) Prior Publication Data

US 2018/0270684 A1    Sep. 20, 2018

Related U.S. Application Data

(63) Continuation of application No. 15/046,198, filed on Feb. 17, 2016, now Pat. No. 10,251,077, which is a
(Continued)

(30) Foreign Application Priority Data

Jan. 28, 2014    (GB) .................................. 1401409.6

(51) Int. Cl.
| | |
|---|---|
| *H04W 24/08* | (2009.01) |
| *H04W 64/00* | (2009.01) |
| *H04H 20/12* | (2008.01) |
| *H04H 20/71* | (2008.01) |
| *H04H 60/51* | (2008.01) |
| *H04W 4/02* | (2018.01) |

(Continued)

(52) U.S. Cl.
CPC ............. *H04W 24/08* (2013.01); *H04H 20/12* (2013.01); *H04H 20/71* (2013.01); *H04H 60/51* (2013.01); *H04W 4/023* (2013.01); *H04W 4/06* (2013.01); *H04W 40/16* (2013.01); *H04W 64/00* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 8,155,649 B2 | 4/2012 | McHenry et al. | |
| 8,531,291 B2 | 9/2013 | Tran | |

(Continued)

FOREIGN PATENT DOCUMENTS

| | | |
|---|---|---|
| WO | 2008/032920 A1 | 3/2008 |
| WO | 2013/089747 A1 | 6/2013 |
| WO | 2014/157936 A1 | 10/2014 |

*Primary Examiner* — Kodzovi Acolatse
(74) *Attorney, Agent, or Firm* — Potomac Law Group, PLLC; Vincent M DeLuca

(57) ABSTRACT

A method of estimating the proximity of a first device to a second device in a network causes the first device to perform a first measurement in a first period during which a control message broadcasted over the network instructs devices in the network to not transmit during the first period, wherein the second device disregards the control message and transmits a first signal during the first period which is measured by the first device during the first period, and forms a measure of the proximity of the first device to the second device in dependence on a strength of the first signal.

16 Claims, 9 Drawing Sheets

Related U.S. Application Data continuation of application No. 14/607,179, filed on Jan. 28, 2015, now Pat. No. 9,300,419.

(51) Int. Cl.
*H04W 4/06* (2009.01)
*H04W 40/16* (2009.01)
*H04W 84/12* (2009.01)

(56) References Cited

U.S. PATENT DOCUMENTS

| | | | |
|---|---|---|---|
| 9,178,593 B1 | 11/2015 | Liu et al. | |
| 9,179,331 B2 | 11/2015 | Shin et al. | |
| 2003/0228846 A1 | 12/2003 | Berliner et al. | |
| 2006/0193299 A1 | 8/2006 | Winget et al. | |
| 2007/0002890 A1* | 1/2007 | Mangold | H04W 8/22 370/459 |
| 2007/0165586 A1 | 7/2007 | Taylor et al. | |
| 2008/0146263 A1 | 6/2008 | Shiouchi et al. | |
| 2008/0316031 A1 | 12/2008 | Kalama et al. | |
| 2009/0017801 A1 | 1/2009 | Laroia et al. | |
| 2010/0159833 A1 | 6/2010 | Lewis et al. | |
| 2010/0304690 A1 | 12/2010 | Proefke et al. | |
| 2011/0034179 A1 | 2/2011 | MacNaughtan et al. | |
| 2011/0287795 A1 | 11/2011 | Cahill | |
| 2012/0320741 A1 | 12/2012 | Freda et al. | |
| 2013/0234536 A1 | 9/2013 | Chemishkian et al. | |
| 2013/0237238 A1* | 9/2013 | Kronander | H04W 48/16 455/452.1 |
| 2014/0003373 A1 | 1/2014 | Hakola et al. | |
| 2014/0211640 A1* | 7/2014 | Tahir | H04L 12/413 370/252 |
| 2014/0301260 A1* | 10/2014 | Park | H04W 74/06 370/311 |
| 2015/0358780 A1 | 12/2015 | Saari et al. | |
| 2017/0003931 A1* | 1/2017 | Dvortsov | G11B 27/11 |
| 2017/0026791 A1* | 1/2017 | Weizman | H04W 64/00 |

* cited by examiner

PROXIMITY DETECTION

BACKGROUND OF THE INVENTION

This invention relates to methods, apparatus and systems for estimating the proximity of a wireless device to one or more other wireless devices.

The ability to communicate data wirelessly at high data rates has led to many new and improved applications and devices. Some systems which traditionally were wired are now being improved by replacing the wires with wireless capabilities. For example, traditional 5.1 surround sound systems require 6 speakers to be located in different parts of a room and to be wired to a central receiver. Many users have found the cabling required to install such a system to be very inconvenient and cumbersome. Thus multi-speaker systems have been provided with wireless capability which allows users to easily install and use the systems.

Some wireless multi-speaker systems employ a hub which is wirelessly connected to the speakers in the system. The hub can store a user's music collection and can control the output of the speakers in the system. A user can select the output of the speakers via, for example, a user interface on the hub or a device connected to the hub. In a multi-room environment, for example, a speaker may be provided in each room in a house. A user can select, via the hub, which speaker is to provide the audio output and the hub transmits audio data to the selected speaker for playback. This allows the user to listen to audio in whichever room a speaker is placed without requiring each room to have an individual store of music.

Typically such systems employing a hub operate in a proprietary peer-to-peer mesh network. Such a proprietary system provides the user with flexibility, control and freedom to implement different functions with their proprietary devices. However, a problem with such proprietary systems is that they may not be compatible with devices from other vendors. This can restrict other vendors from making devices (such as additional speakers or media sources) for use in the wireless speaker system and thus also restricts consumer choice.

There is therefore a need for techniques that allow devices to have additional functionality whilst maintaining compatibility with other devices in an environment such as a wireless multi-room environment.

SUMMARY OF THE INVENTION

According to a first aspect of the invention there is provided a method of estimating the proximity of a first device to a second device in a network of devices comprising at least the first and second device, each device in the network being capable of communicating according to a predetermined wireless communications protocol, the method comprising: analysing at the first device a first control message which according to the communications protocol is configured to cause the first device to perform a first channel quality measurement during a first period of time; broadcasting a second control message over the network which according to the communications protocol instructs devices connected to the network to not transmit during the first period of time to enable the first channel quality measurement to be performed; at the second device, disregarding said instruction and transmitting a first signal during at least a portion of the first period of time; at the first device, performing the first channel quality measurement in response to the first control message during the first period of time; and forming a measure of the proximity of the first device to the second device in dependence on a strength of the first signal received at the first device.

The method may further comprise the step of: at the second device, sending the first control message. The second device may broadcast the second control message.

The network of devices may comprise a third device, and the method may further comprise the step of: at the third device, sending the first control message. The method may further comprise the step of: at the third device, sending the second device a transmit-time message, the transmit-time message configured to cause the second device to perform said transmitting step.

The first control message may be generated at the first device.

Preferably, the transmission power of the first signal is modulated in a predefined pattern. Preferably, said forming step comprises analysing a first report message so as to detect a representation of the predefined pattern, said first report message comprising a histogram indicating received power at the first device.

Preferably, the method further comprises the step of: analysing a first report message which according to the first communication protocol indicates the results of the first channel quality measurement.

Preferably, the method further comprises the step of: at a or the third device, transmitting a second signal during at least a portion of a second period of time. The first and second signals may be transmitted at substantially the same power. The said forming step may additionally be dependent on a strength of the second signal received at the first device. The said forming step may comprise comparing the strength of the first signal to the strength of the second signal so as to determine which of the second and third devices is nearest to the first device. The method may further comprise the steps of: at the first device, selecting media for playback; selecting said determined second or third device; and playing back said selected media at said selected second or third device.

Preferably, the method further comprises the steps of: broadcasting a third control message which according to the communications protocol is capable of causing devices to not transmit during a third period of time; and at the first device, performing a second channel quality measurement during the third period of time, wherein said forming step is additionally dependent on the second channel quality measurement.

Preferably, the predetermined wireless communications protocol is a IEEE 802.11 protocol. Preferably, the first control message comprises a measurement request element as defined by the IEEE 802.11 protocol.

According to a second aspect of the invention there is provided a wireless device for estimating the proximity of a first device to a second device in a network of devices comprising at least the first and second devices, each device in the network being capable of communicating according to a predetermined wireless communications protocol, the wireless device comprising: a controller configured to generate a first control message which according to the communications protocol is configured to cause the second device to perform a first channel quality measurement during a first period of time; a transceiver configured to broadcast a second control message over the network which according to the communications protocol is configured to instruct devices connected to the network to not transmit during the first period of time to enable the first channel quality measurement to be performed, the controller being further configured to cause the first device to disregard said instruction and transmit a first signal during at least a portion of the first period of time; and a proximity estimator configured to form a measure of the proximity of the first device to the second device in dependence on a strength of the first signal received at the second device.

The wireless device may be the first device, and the transceiver may be further configured to: send the first control message to the second device; and receive a first report message from the second device. Preferably, the first report indicates the results of the first channel quality measurement in accordance with the communications protocol.

The controller may be configured to generate a transmit-time message; and the transceiver may be configured to send the transmit-time message to the first device so as to cause the first device to disregard said instruction and transmit the first signal.

The wireless device may be the second device.

The transceiver may be further configured to: send the first control message to the second device; and receive a first report message from the second device which according to the communications protocol indicates the results of the first channel quality measurement.

According to a third aspect of the invention there is provided a method of estimating the proximity of a first device to a second device in a network of devices comprising at least the first and second device, each device in the network being capable of communicating according to a predetermined wireless communications protocol, the method comprising: selecting a first channel for performing a first channel quality measurement, the first channel being a channel that is not in use by the network of devices; receiving at the first device a first control message which according to the communications protocol is configured to cause the first device to perform the first channel quality measurement on the first channel during a first period of time; at the second device, transmitting a first signal on the first channel during at least a portion of the first period of time; at the first device, performing the first channel quality measurement in response to the first control message during the first period of time; and forming a measure of the proximity of the first device to the second device in dependence on a strength of the first signal received at the first device.

The method may further comprise the step of maintaining a connection between the first and second device on a second channel during at least a portion of the first time period.

The method may further comprise the step of maintaining a connection between the second device and a third device on a second channel during at least a portion of the first time period.

The network of devices may comprise a third device, and the method may further comprise the steps of: at the third device, sending the first control message; at the third device, sending the second device a transmit-time message, the transmit-time message configured to cause the second device to perform said transmitting step.

The method may further comprise the step of: at the second device, prior to said transmitting step, disabling a connection between the second device and the first device, said connection being over a second channel.

The network of devices may comprise a fourth device, the method may further comprise the step of maintaining a connection between the third and fourth device on a second channel during at least a portion of the first time period.

According to a fourth aspect of the invention there is provided a wireless device for estimating the proximity of a first device to a second device in a network of devices comprising at least the first and second devices, each device in the network being configured to communicate over a communications channel according to a predetermined wireless communications protocol, the wireless device comprising: a controller configured to select a first channel for performing a first channel quality measurement, the first channel being a channel that is not the communications channel; a transceiver configured to send a first control message to the second device which according to the communications protocol is configured to cause the second device to perform the first channel quality measurement on the first channel during a first period of time, the controller being further configured to cause the first device to transmit a first signal during at least a portion of the first period of time; and a proximity estimator configured to form a measure of the proximity of the first device to the second device in dependence on a strength of the first signal received at the second device.

The first device may be the wireless device, and the transceiver may be further configured to: send the first control message to the second device; and receive a first report message from the second device. Preferably, the first report indicates the results of the first channel quality measurement in accordance with the communications protocol.

The controller may be configured to generate a transmit-time message; and the transceiver may be configured to send the transmit-time message to the first device so as to cause the first device to disregard said instruction and transmit the first signal.

According to a fifth aspect of the invention there is provided machine readable code for implementing the methods.

According to a sixth aspect of the invention there is provided a machine readable storage medium having encoded thereon non-transitory machine readable code for implementing the methods.

BRIEF DESCRIPTION OF THE DRAWINGS

The present invention will now be described by way of example with reference to the accompanying drawings, in which.

DETAILED DESCRIPTION OF THE INVENTION

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The Wi-Fi communications protocol is commonly used for many wireless applications between computing devices, network servers and the like. It is increasingly being used in domestic applications for functions such as streaming or playing back audio and/or video data and other multi-media applications such as gaming using portable gaming devices. The methods, devices and networks disclosed below will be described with reference to devices and networks that can operate in accordance with the IEEE 802.11 Wi-Fi communications protocol. The general principles described below can be applied to devices and systems operating according to other communications protocols such as Bluetooth.

Figure 1:
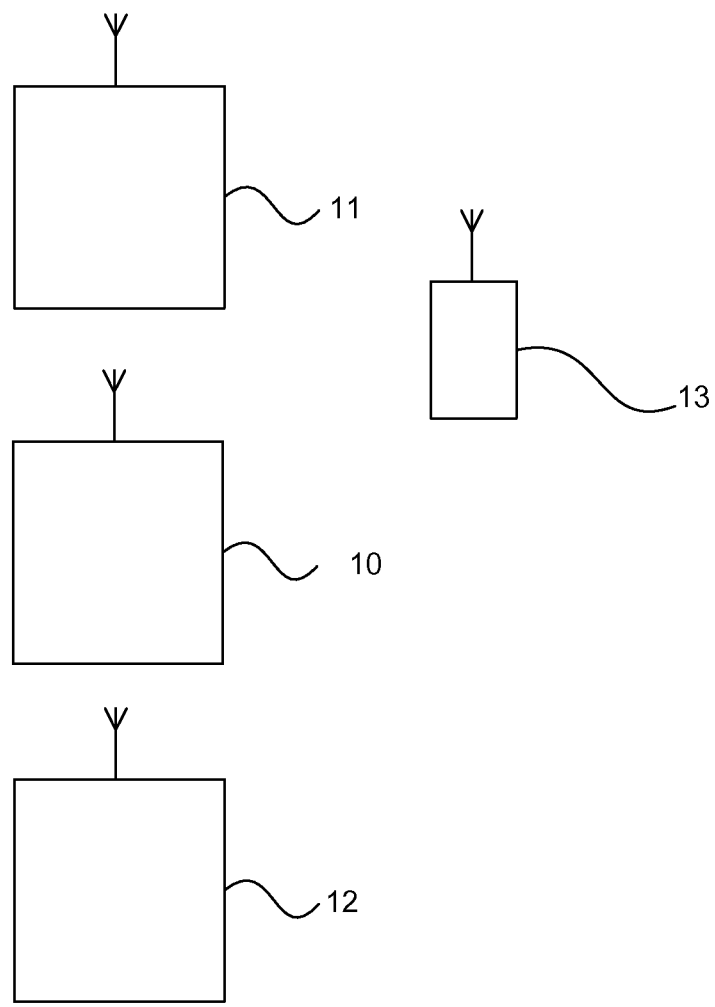
FIG. 1 depicts an example network comprising wireless devices.

FIG. 1 is a schematic diagram illustrating an example network 100, which may be, for example, implemented in a home having an access point (AP) 10 and multiple wireless stations (STAs) 11, 12. In one example, the STAs 11, 12 may be media playback devices such as wireless speakers. The AP 10 may be connected to a media source and may also include a loudspeaker for playback. The media source can be located in the internet (e.g. a streaming service), connected to the AP 10 (e.g. stored on a local computer, mobile device, or network drive), or can be derived from one of the STAs (e.g. the media may be broadcast via DAB and received at one STA equipped with a DAB receiver and provided to another STA over Wi-Fi) or stored on an STA. A user may operate a portable device 13, which may be, for example, a smartphone, tablet, laptop, watch, etc that is able connect, via Wi-Fi, to the AP 10 or, in some modes (such as Wi-Fi direct), to one of the STAs 11 or 12 to control operation thereof.

In some applications, it may be advantageous to determine the position of the portable device 13 relative to the AP 10 and STAs 11, 12. For example, in a multi-room media environment, it may be advantageous to determine the position of a user (who may be carrying the portable device 13) relative to wireless speakers, which may be AP 10 and STAs 11, 12. By determining the position of the portable device 13, the AP 10, or STA 11 or 12 that is closest to the portable device 13 can be automatically selected, e.g., for playback of audio.

The proximity of the portable device 13 to the AP 10 or STAs 11, 12 can be estimated by manipulating certain features of the Wi-Fi standard, without breaking the rules laid out by the standard. According to the standard these features are used for purposes other than determining the proximity of a Wi-Fi device relative to other Wi-Fi devices. By utilising these features in a new way, it is possible for devices to conform with and operate in accordance with the standard and still be able to provide the new feature of proximity estimation that is not defined in the standard.

Figure 2:
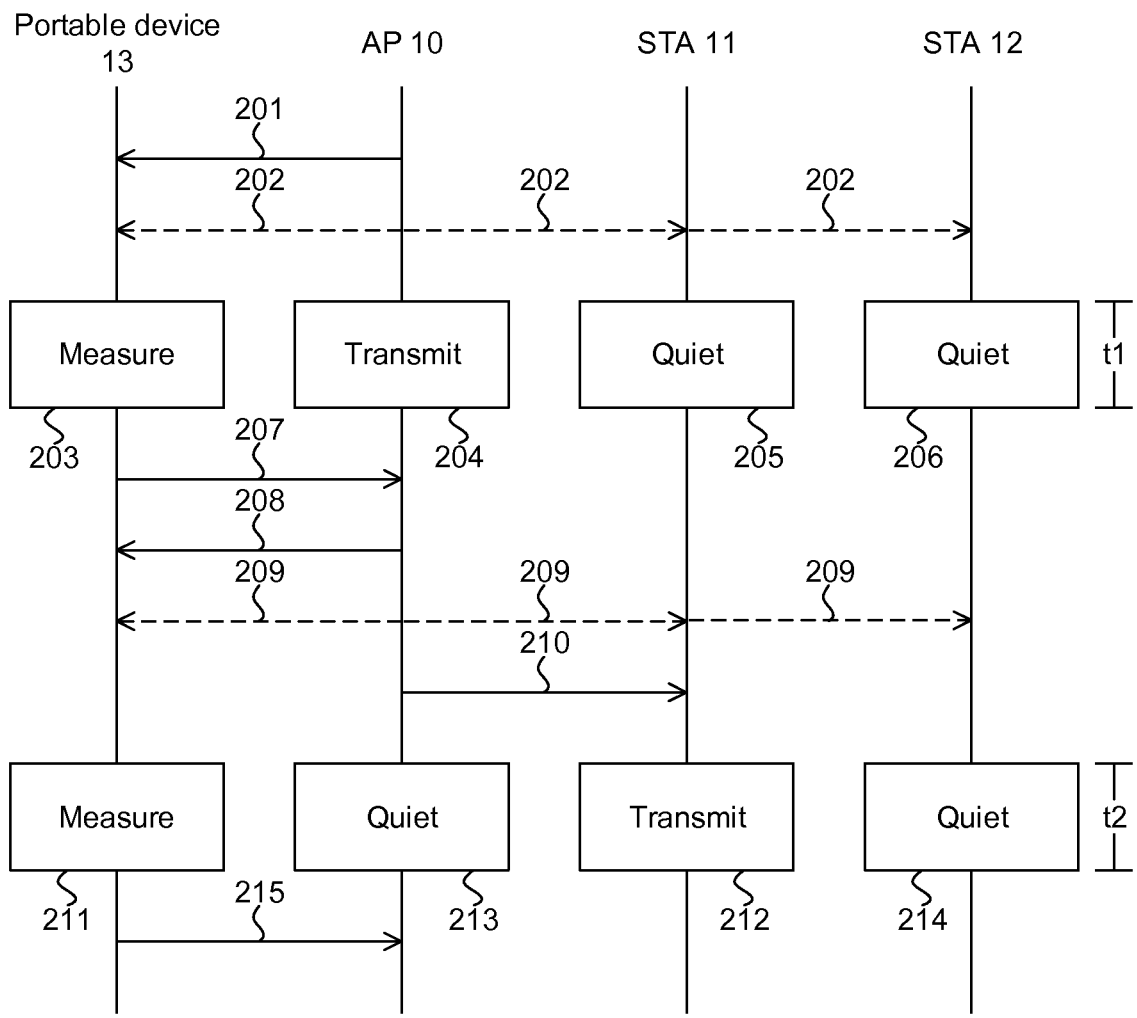
FIG. 2 depicts an example process for estimating the proximity of a wireless device to other wireless devices.

FIG. 2 depicts a process for estimating the proximity of the portable device 13 to the AP 10 and STA 11. The process for estimating the proximity of the portable device 13 to STA 12 is similar to that for STA 11.

In the example processes described herein, the wireless network 100 can operate in infrastructure mode or in an ad-hoc or independent basic service set (IBSS) mode. In the IBSS mode, the AP 10 may be an STA that operates as a software enabled access point (softAP). The softAP can connect to another AP (not shown) to enable data to be sent to and from the IBSS.

The AP 10 sends a first control message to the portable device 13. The first control message may be a message that is compliant with the Wi-Fi standard, such as a measurement request 201. According to the standard, such measurement requests are used to avoid co-channel operation with interfering systems (such as radar systems), gathering information on the state of a channel so as to assist in the choice of a new channel, and assess the general level of interference present on a channel. Thus, such measurement requests are traditionally used by Wi-Fi compliant devices to detect interference so as to avoid channels with high interference.

As required by the Wi-Fi standard, the measurement request 201 contains a request that the receiving STA performs the specified measurement action. The AP 10 is able to specify certain parameters for the measurement request 201, such as the measurement type (which may be a basic request, clear channel assessment (CCA) request or receive power indicator (RPI) histogram request), channel number, measurement start time and measurement duration. Thus the AP 10 is able to specify a period of time t1 for the portable device 13 to perform the measurement.

The AP 10 broadcasts a second control message (which may have a different format to the first control message) which can cause devices that receive the message to remain quiet (i.e. not transmit) during a specified period of time. The control message may be a frame (such as a beacon frame or probe response frame) that contains a quiet element (hereinafter referred to as quiet message 202). As specified by the Wi-Fi standard, transmitting one or more quiet elements allows the scheduling of quiet intervals, during which no transmission on the network 100 shall occur in the current channel. Fields within the quiet element such as the quiet count, quiet period, quiet duration and quiet offset can be used by the AP 10 to specify a period of time during which devices in the network are to remain quiet. The AP 10 broadcasts the quiet message 202, which can be received by the devices in the network (e.g. STAs 11 and 12 and portable device 13) to instruct those devices to remain quiet during specified period of time t1. By broadcasting the quiet message 202, the AP 10 also instructs itself to remain quiet during specified period of time t1. The specified period of time in the quiet message can be the same time period t1 that is specified in the measurement request 201. This allows the portable device 13 to perform the measurement without interference from STAs 11 and 12 as they will not transmit during quiet intervals 205 and 206.

The portable device 13 performs the measurement specified by the measurement request 201 during time period t1. During at least a portion of time period t1, the AP 10 transmits a first signal 204. By generating and broadcasting the quiet message 202 the AP 10 is also required to remain quiet. However, the AP 10 disregards the instruction to remain quiet and does not stay quiet during the quiet interval so that it can transmit first signal 204. The first signal 204 can be detectable by the portable device 13 while performing the measurement (if the portable device 13 is within range at that time). The first signal 204 will be transmitted on the channel (which can be specified in the measurement request 201) on which the measurement 203 is being performed. The transmission power of the first signal 204 may be at a predetermined power level.

The first signal 204 can be transmitted during the whole or a portion of the time period t1. For example, the first signal 204 may be transmitted during half of time period t1. By varying the power of the first signal 204 in a predetermined pattern, it can be possible to determine that a signal measured during the measurement 203 is the first signal 204. The sub-section entitled "Detecting a predefined power pattern" below provides examples of how the first signal 204 can be identified.

After time period t1 expires, the measurement process 203, transmission of the first signal 204 and quiet interval 205 and 206 will have ended.

In accordance with the Wi-Fi standards, in response to the measurement request 201, the portable device 13 transmits a measurement report 207 which provides measurement information gathered during the measurement process 203. The measurement report 207 can be received by the AP 10. In dependence on the measurement report 207, the AP 10 can form a measure of the proximity of the portable device 13 to the AP 10. The measurement information provided by the measurement report 207 may be indicative of the first signal 204 transmitted by the AP 10. As the other STAs 11 and 12 are quiet while the measurement 203 is taking place, the received power at the portable device 13 may be mostly from the first signal 204 and any background noise (which can be subtracted as described below). Thus the information provided in the measurement report 207 can be indicative of the received power of first signal 204 (and not any transmissions from STAs 11 and 12), which can be used to estimate the proximity of the portable device 13 to AP 10.

The measurement report 207 may comprise a RPI histogram report, as defined in the Wi-Fi standard. The RPI histogram report comprises RPI densities observed during the measurement period 203 at eight RPI levels or "buckets". This can provide an indication of the received power level of the first signal 204 at the portable device 13, which can provide an indication of the proximity of the portable device 13 to the AP 10. For example, if the RPI histogram report has a greater number of RPI densities at RPI 0 (Power≤−87 dBm), than at higher RPI densities, then this can indicate the portable device 13 is relatively far from the AP 10. If the RPI histogram report has a greater number of RPI densities at RPI 7 (−57 dBm<Power), than at lower RPI densities, then this can indicate that the portable device 13 is relatively close to the AP 10. Thus a measure of the distance between the AP 10 and the portable device 13 can be formed by analysing the RPI histogram report. Examples of how the RPI histogram report may be utilised to provide an indication of the proximity of devices are given below in the "Detecting a predefined power pattern" sub-section.

The AP 10 can also estimate the proximity of portable device 13 to STA 11. Steps 208 to 215 described below describe a process for estimating the proximity of the portable device 13 to STA 11. These steps may be performed independently of the proximity measure of the portable device 13 to AP 10 described above in steps 201-207. Alternatively, steps 208 to 215 can be performed in addition to the proximity measure of the portable device 13 to AP 10.

The AP 10 sends a second measurement request 208 to the portable device 13. Measurement request 208 may specify the same parameters as measurement request 201, but with a different measurement start time. Thus the AP 10 is able to specify a second period of time t2 for the portable device 13 to perform a second measurement 211. The AP 10 broadcasts a second quiet message 209, instructing devices in the network 100 (including the AP 10 itself) to remain quiet during time period t2.

The AP 10 sends a message (herein after referred to as transmit-time message 210) to STA 11 that instructs STA 11 to transmit a second signal 212 during at least a portion of time period t2. The transmit-time message may be sent before or after the AP broadcasts the second quiet message 209 (but before the second measurement 211). The transmit-time message 210 may indicate parameters for the second signal 212 so that the STA 11 transmits a second signal 212 that has substantially similar properties (such as the transmit power, the power variation pattern, channel, etc) as the first signal 204. The properties of the first and second signals 204 and 212 can be predetermined such that, by default, the AP 10 and STAs 11 and 12, transmit the signals with the same predetermined properties. When estimating the proximity of the portable device 13 to the STA 11, it is preferable that the first and second signals 204 and 212 have similar properties. This allows the measurement results from those signals to be compared to determine the proximity of the portable device 13 relative to the AP 10 and the STA 11. The AP 10 will remain quiet (i.e. not transmit) during time period t2. This quiet interval 213 for the AP 10 may be triggered by sending quiet message 209 or by sending the transmit-time message 210.

STA 11 receives the transmit-time message 210, which causes the STA 11 to disregard (or, in other words, override) the instruction in the quiet message 209 to remain quiet and transmit the second signal 212 during the second time period t2.

The transmit-time message 210 may be a message that is sent at a higher level than a Wi-Fi command. For example, the transmit time message 210 may be a message sent over a layer (e.g. a UPNP command layer or an application layer) that is above the lower level Wi-Fi functions and allows the devices in the network to exchange data.

During the second time period t2, the portable device 13 performs the second measurement 211, STA 11 transmits the second signal 212 and AP 10 and STA 12 do not transmit during quiet intervals 213 and 214. Thus, the portable device 13 is able to receive a second signal 212 from STA 11 without interference from the AP 11 and STA 12. In accordance with the Wi-Fi standard, a second measurement report 215 is sent from the portable device 13 to the AP 10 indicating the received power of the second signal 212 from STA 11. A measure of the proximity of the portable device 13 to STA 12 may be, for example, based on the second measurement report alone if, for example, the second measurement report comprised a RPI histogram report, as described above. Alternatively, the measure of proximity could be based on a comparison of the first and second measurement reports. The received power levels indicated in the first and second measurement reports 207 and 215 can be compared so as to estimate the proximities of the AP 10 and STA 11 relative to the portable device 13. For example, if the reports 207 and 215 indicate that the power received during the second measurement 211 is greater than the power received during the first measurement 203, the AP 10 may determine that STA 11 is closer to the portable device 13 than the AP 10.

In the processes described herein, the AP 10 can determine background noise power by sending additional measurement requests to the portable device 13 to perform background measurements. The AP 10 may broadcast additional quiet messages so that the devices in the network (including the AP 10) are quiet during the background measurements. These quiet messages are similar to quiet messages 202 and 209, however they will not be disregarded as all of the devices in the network will need to remain quiet for the background measurements to take place. The detected power levels from the background measurements can be subtracted from the power levels received during the measurement processes 203 and 211 to provide a more accurate measure of the received power from the first and second signals 204 and 212.

The proximity of STA 12 (and any other STAs that may be connected to the AP 10) to the portable device 13 may be estimated in a similar manner to that of STA 11. The proximity estimate may be performed independently of the other measurement reports indicating the received power from the other devices in the network. Alternatively, the proximity estimate for STA 12 may be performed based on one or more additional measurement report 207 and/or 215 indicating the received power from AP 10 and/or STA 11.

The AP 10 can receive a plurality of measurement reports from the portable device 13, each report indicating the received power level of a signal transmitted by a device in the network (AP 10 and STAs 11, 12). The level of power in each report provides an indication of the distance of the transmitting device from the measuring device, which in this case is the portable device 13. By comparing the power levels of each report it is possible to determine the relative proximity of the transmitting devices from the portable device 13.

The estimate of the proximity of the portable device 13 to the AP 10 and STAs 11 and 12 may be used to select one of the AP 10, STA 11 or STA 12 that is closest to the portable device 13. This selection of the closest device may be, for example, a selection of the closest wireless speaker to the smartphone of a user. The proximity estimate may be carried out periodically for all the devices that are connected to the AP 10 as the portable device 13 may move to different locations and thus the closet device 10, 11 or 12 to the portable device 13 may change. Thus in a multi-room environment, a user carrying a portable device 13 such as a smart phone may move from a first room to a second room and have the speaker in the second room automatically play the music that was being played in the first room without the user having to select the speaker in the second room. The AP 10 can determine which speaker is closest to the user, select the speaker that is closest to the user, and send a message to that closest speaker to play music. If a speaker that is playing music is not the speaker that is closest to the user, the AP 10 may also send a message to that speaker to stop playing music.

Sequences of proximity measurements can be stored and analysed in an application layer program at the AP, for example to determine whether the portable device 13 is fixed or mobile, or to track the movement relative to one or more of devices 10, 11 or 12. This can be used to predict movement (e.g. moving away from or towards given a given device 10, 11 or 12), or can be correlated with time-of-day information to generate typical movement patterns for a given user of a portable device 13 (e.g. certain times of the day spent in particular rooms).

In the process described above, the steps (e.g. receiving a measurement request, performing a measurement in response and in accordance with that request, sending a measurement report, receiving quiet messages, etc) carried out by the portable device 13 can be carried out by any device that conforms with the Wi-Fi standard. Also, some of the steps carried out by the STAs can be carried out by any device that conforms with the Wi-Fi standard (e.g. receiving a quiet message and not transmitting in response to the quiet message).

Some of the steps carried out by the AP 10 and STAs 11 and 12 may not conform to the Wi-Fi standard (e.g. disregarding the second quiet message 209 to transmit the second signal 212 during the time period t2 as the quiet interval specified in the received second quiet message 209). In this case, the STA 11 receives a transmit-time message 210 (which can be communicated, for example, in accordance with a higher level protocol, such as UPnP), which causes the STA 11 to override any actions set out by the Wi-Fi controller of that STA 11 and instead transmit the second signal 212 as specified by the transmit-time message 210.

The overriding action described above is possible by allowing layers above the Wi-Fi MAC layer (e.g. applications) to control certain aspects of Wi-Fi MAC layer that would normally not be permissible under the Wi-Fi standard.

Figure 3:
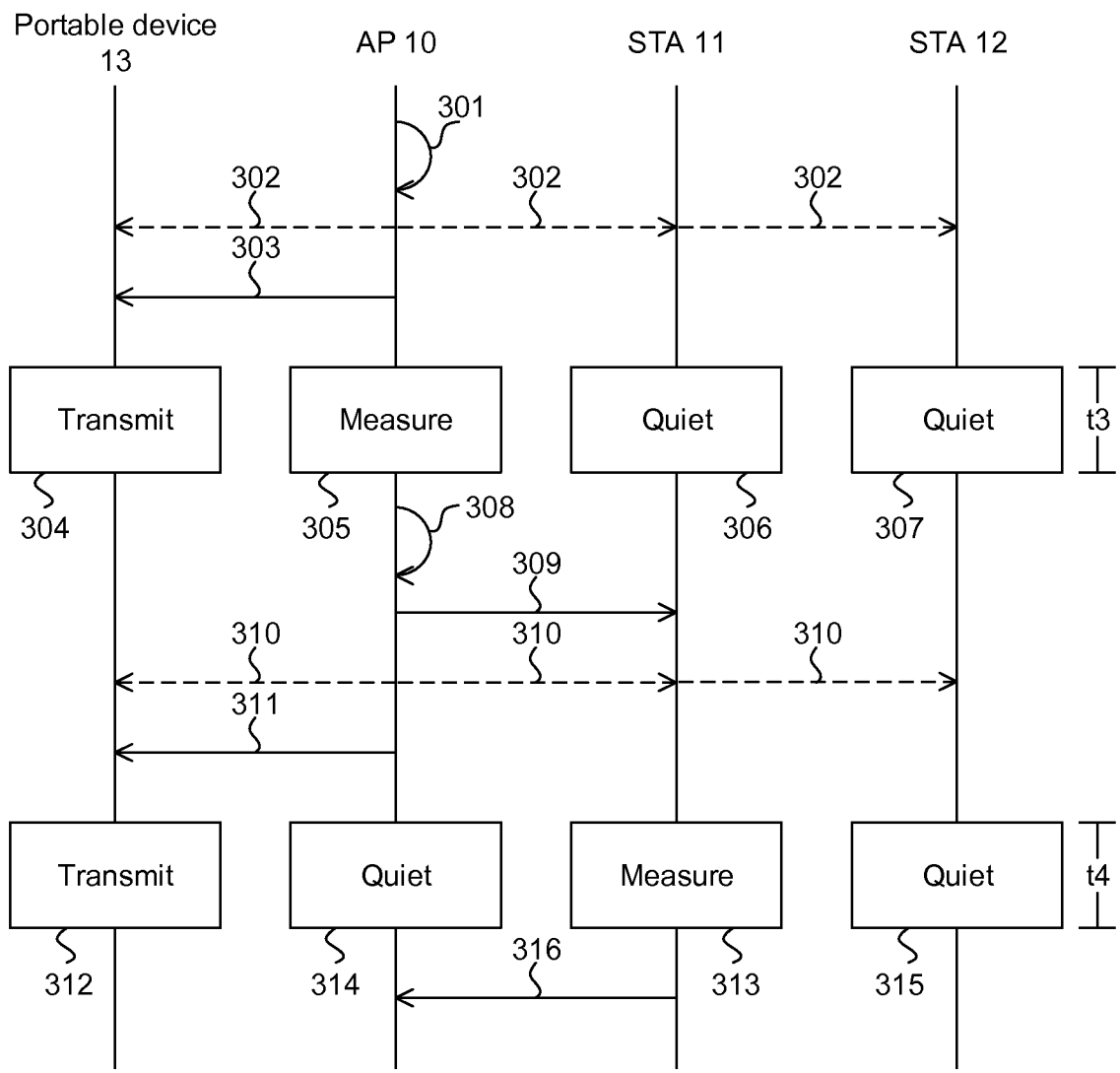
FIG. 3 depicts another example process for estimating the proximity of a wireless device to other wireless devices.

FIG. 3 depicts another process for estimating the proximity of the portable device 13 to the AP 10 and STA 11. In this process, certain aspects of the Wi-Fi MAC layer at the portable device 13 are capable of being controlled by higher layers, such as applications.

Steps 301 to 308 describe the process for estimating the proximity of the portable device 13 to the AP 10. Steps 309 to 316 describes another process for estimating the proximity of the portable device 13 to STA 11. The process for estimating the proximity of the portable device 13 to STA 11 may be performed independently of the process for estimating the proximity of the portable device 13 to AP 10, as described in steps 301 to 308. Alternatively, steps 309 to 316 can be performed in addition to steps 301 to 308 to estimate the proximity of the portable device 13 to AP 10 and/or STA 11.

A higher level entity, such as an application, at the AP 10 can trigger the sending of a control message to the lower MAC layers of the AP 10. For example, the control message 301 may be a message that is compliant with the Wi-Fi standard, such as a MLME-MEASURE.request message. The MLME-MEASURE.request message causes the AP 10 to perform measurements in a similar manner to the measurement requests 201 and 208 described above. The control message 301 is able to specify a period of time t3 for the AP to perform a measurement 305. Similarly to above, the AP 10 broadcasts a quiet message 302 specifying that devices in the network 100 remain quiet during time period t3.

The AP 10 sends a transmit-time message 303 (similarly to transmit-time message 210 described above) to portable device 13, which instructs portable device 13 to transmit a signal 304 during at least a portion of time period t3. The signal 304 may be similar to signals 204 and 212 described above. The transmit-time message 303 causes the portable device 13 to disregard the quiet message 302 and transmit the signal 304 during time period t3. The transmit-time message 303 may be sent before or after quiet message 302 (but before the measurement period 305).

During the time period t3, AP 10 performs the measurement 305 as requested, portable device 13 transmits the signal 304 and STAs 11 and 12 remain quiet during quiet intervals 306 and 307. Thus, the AP 10 is able to receive signal 304 from portable device 13 without any potential interference from STAs 11 and 12.

The AP 10 may generate measurement report 308 (which may be similar to measurement reports 207 and 215 described above) indicating the received power of the signal 304 from the portable device 13. The measurement report 308 may reported to the higher layers entitles at the AP 10 via, for example, the MLME-MEASURE.confirm primitive in accordance with the Wi-Fi standard.

Steps 309 to 316 describe a process for estimating the proximity of the portable device 13 to STA 11.

The AP 10 sends a measurement request 309 to STA 11. The measurement request 309 is similar to measurement requests 201 and 208 described above. Similarly to above, the AP 10 broadcasts a quiet message 310 specifying that devices in the network 100 remain quiet during time period t4.

The AP 10 sends a transmit-time message 311 (which is similar to transmit-time message 210 described above) to portable device 13, which instructs portable device 13 to transmit a signal 312 during at least a portion of time period t4. The signal 312 may be similar to signals 204 and 212 described above. The transmit-time message 311 causes the portable device 13 to disregard the quiet message 310 and transmit the signal 312 during time period t4. The transmit-time message 311 may be sent before or after quiet message 310 (but before the measurement period 313).

During time period t4, STA 11 performs measurement 313 as requested, portable device 13 transmits signal 312 and AP 10 and STA 12 remain quiet during quiet intervals 314 and 315. Thus, the STA 11 is able to receive signal 312 from portable device 13 without any potential interference from AP 10 and STA 12.

The STA 11 generates and sends measurement report 316 (which may be similar to measurement reports 207 and 215 described above) to the AP 10 indicating the received power of signal 312 from the portable device 13. As described above, the measurement report 316 can be used to determine a measure of the proximity of the portable device 13 to STA 11. Alternatively, a measure of proximity of the portable device 13 to STA 11 could be based on a comparison of measurement reports 308 and 316.

Figure 4A:
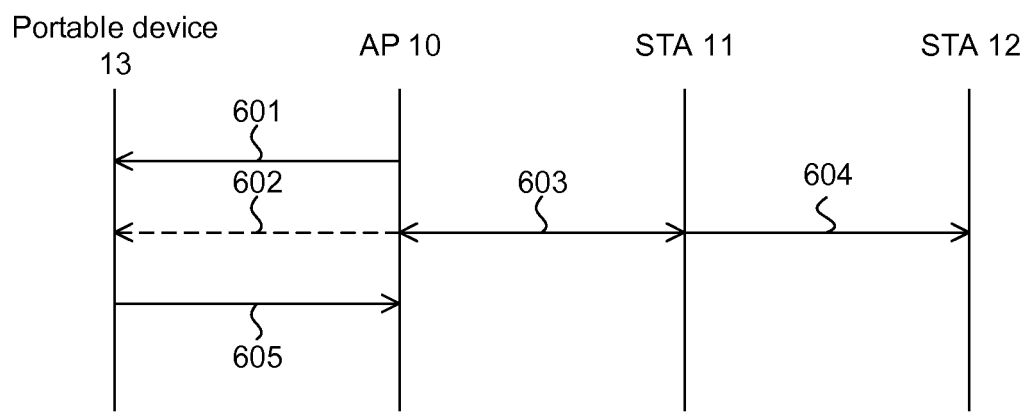
FIGS. 4a and 4b depicts yet another example process for estimating the proximity of a wireless device to other wireless devices.
Figure 4B:
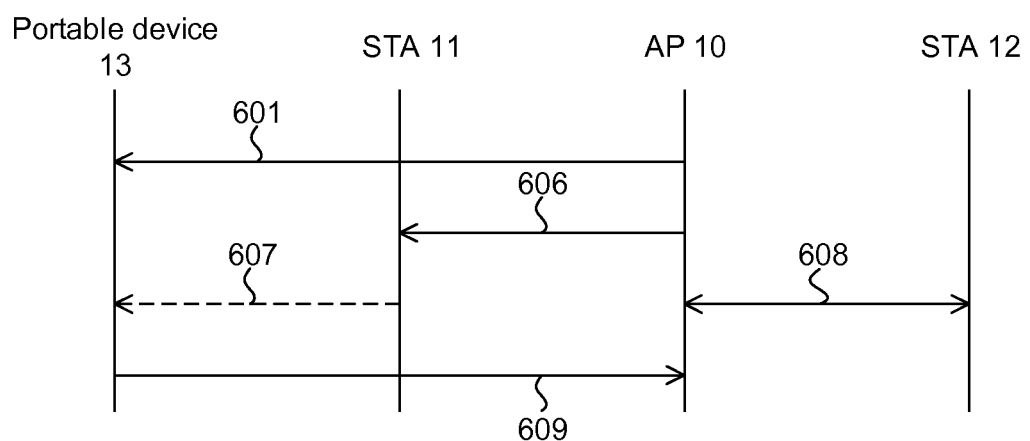

FIG. 4a depicts another process for estimating the proximity of the portable device 13 to the AP 10. FIG. 4b depicts another process for estimating the proximity of the portable device 13 to the STA 11. In these processes, the signal that is measured during the measurement period is transmitted on a channel that is not currently being used by the devices in the network. Thus, a channel that is different to the channel being used to communicate data between the devices can be used to carry out the measurements. In these examples, a quiet message need not be sent and so the devices in the network can continue to communicate data without having to observe a quiet period. This can be particularly advantageous when streaming real-time media between devices.

In the processes of FIGS. 4a and 4b, the AP 10 can determine a channel upon which the measurement for estimating proximity should be carried out. This determination can be based, for example, on a channel assessment (e.g. a CCA) carried out by the AP 10 or another device on the network to select a clear channel or a random selection of a channel (hereinafter referred to as the "selected channel") that is not currently being used within the network. Preferably, the selected channel does not overlap with a channel that is currently being used by devices in the network so that normal traffic does not interfere with the proximity measurement. The channel currently being used (hereinafter referred to as the "connection channel") for traffic may have been determined, for example, when connections between the devices in the network were established or during a channel switch.

As shown in the process in FIG. 4a, the AP 10 sends a measurement request 601 to the portable device 13. The measurement request 601 may be similar to measurement request 201 described above. The AP 10 specifies the selected channel number in the measurement request 601 and a time period for carrying out the measurement. The measurement request 601 may be sent over the connection channel between the AP 10 and the portable device 13. The specified selected channel in the measurement request 601 is different to the connection channel.

The AP 10 may have two RF interfaces (e.g. in the case of WiFi devices, the 802.11n or later standards provide for 2.4 GHz and 5 GHz interfaces), which can allow the AP 10 to communicate simultaneously on two different channels. Thus, at the measurement time period, the AP 10 transmits a signal 602 (which may be may be similar to signal 204 described herein) on the selected channel whilst maintaining a connection with STA 11 and/or STA 12 on the connection channel, over which it can communicate data 603 and/or 604 with STA 11 and/or STA 12 respectively. Once the measurement of signal 602 on the selected channel is complete, a measurement report 605 (which may be similar to measurement report 207 described herein) for that signal 602 is generated by the portable device 13. The portable device 13 may then transmit the measurement report 605 to the AP 10 over the connection channel. The measurement report 605 may then be used to estimate the proximity of the portable device 13 to the AP 10 as described herein in relation to measurement report 207.

The process of FIG. 4b shows how the proximity of the portable device 13 to STA 11 can be estimated. The proximity of portable device 13 to STA 12 can also be estimated in a similar manner. The AP 10 sends a measurement request 601, as described above, to the portable device 13 over the connection channel. The measurement request specifies the measurement time period and the selected channel for carrying out the measurement. The AP 10 also sends a transmit-time message 606 (which may be similar to transmit-time message 210 described herein) to STA 11 specifying the time period and channel to transmit signal 607 (which may be similar to signal 602 described above).

STA 11 may have one or two RF interfaces. If STA 11 has two RF interfaces, then STA 11 can transmit signal 607 on the selected channel and simultaneously maintain a connection with AP 10 on the connection channel, as described above in relation to the AP 10 with two RF interfaces. If STA 11 has one RF interface, then the STA 11 may temporally disable its connection with AP 10 and switch channels from the connection channel to the selected channel to carry out the transmission of signal 607. Whilst signal 607 is being transmitted by STA 11, AP 10 may maintain a connection with STA 12 over the connection channel to communicate data 608. Once signal 607 has been transmitted, STA 11 can switch back to the connection channel and reconnect with the AP 10 to transmit measurement report 609, which may then be used to estimate the proximity of the portable device 13 to the STA 11 as described herein in relation to measurement report 207. Thus, the processes described in relation to FIGS. 4a and 4b allow the proximity estimate to be carried out without any quiet periods.

Figure 5:
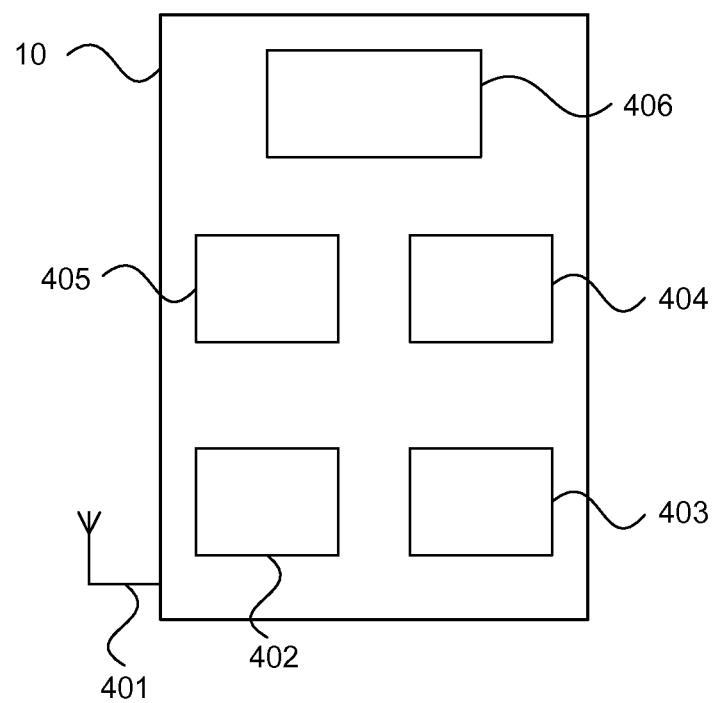
FIG. 5 is a schematic diagram of an access point.

FIG. 5 is a schematic diagram of AP 10. The AP 10 may be a dedicated access point device or an STA operating as a softAP. The AP 10 comprises a Wi-Fi antenna 401, a Wi-Fi transceiver 402, a Wi-Fi driver 403 and a proximity measurer 404. The Wi-Fi antenna 401, Wi-Fi transceiver 402 and Wi-Fi driver 403 may operate in accordance with the Wi-Fi standard. Proximity measurer 404 may be an application that controls the process for estimating the proximity of the portable device 13 to the AP 10 and/or STAs 11 and 12 in the network 100. The proximity measurer 404 can have access to the Wi-Fi driver 403, which allows it to trigger or control certain functions of the Wi-Fi driver 403. These functions may be to, for example, populate and trigger sending measurement requests and quiet messages, accessing received measurement reports, cause the transmission of the signal to be measured, override any quiet messages, etc. The proximity measurer 404 may collate and analyse the data from received measurement reports to form a measure of the proximity of the portable device 13 to the AP 10 and/or STAs 11 and 12 in the network, as described above.

When sending the measurement request messages to a device for estimating proximity, the AP 10 can store a record of the measurement start time against the identity of the device that is making the measurement. The received measurement report from that device contains the start time of the measurement so the AP 10 can correlate the measurement report received to the device that made the measurement. This allows the AP 10 to extract the correct measurement report for the device from any other devices that may be making interference measurements normally (as part of the standard).

In the example of a wireless media device, the proximity measurer 404 may determine which of the AP 10 or STAs 11 or 12 is closest to the portable device 13 and provide the identification of the closest device to media controller 405. The media controller 405 controls the playback of media and can select the identified closest device for playback of media.

Figure 6:
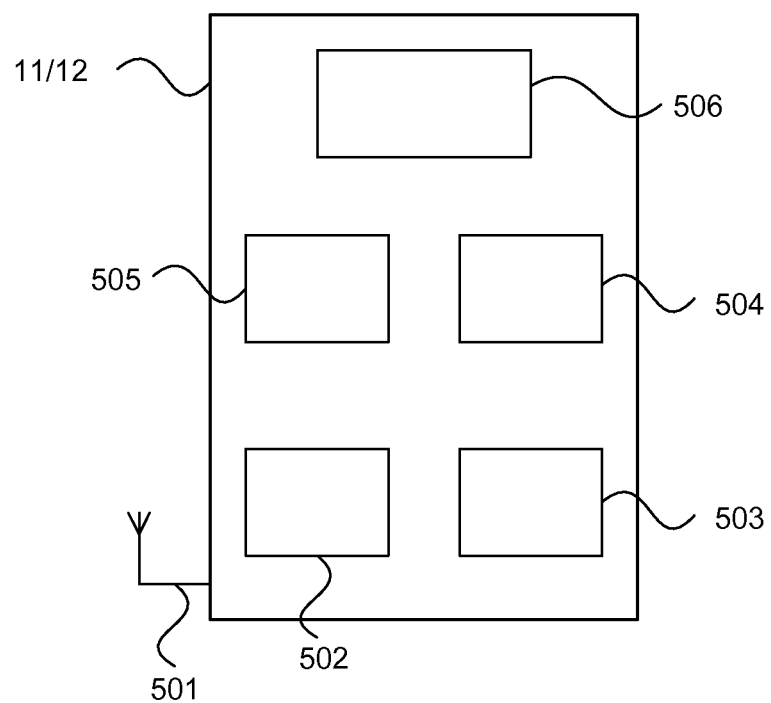
FIG. 6 is a schematic diagram of a wireless station.

FIG. 6 is a schematic diagram of STA 11, 12. The STA 11, 12 may or may not have any AP or softAP capabilities. The STA 11, 12 comprises a Wi-Fi antenna 501, a Wi-Fi transceiver 502, a Wi-Fi driver 503 and a controller 504. The Wi-Fi antenna 501, Wi-Fi transceiver 502 and Wi-Fi driver 503 may operate in accordance with the Wi-Fi standard.

In the proximity estimation process described above in FIG. 2, the STA 11 is required to disregard quiet message 209 and transmit a signal 212 during a quiet interval t2. Reception of the quiet message 209 would normally cause the Wi-Fi driver 503 to cause the Wi-Fi transceiver 502 to not transmit during the quiet period t2. However, controller 504, which may be an application running on the STA 11 or 12, receives instructions (prior or subsequent to receiving the quiet message 209) via the transmit-time message 210 to transmit signal 212 during t2. The controller 504 can access the Wi-Fi driver 503 and cause it to override the quiet interval and transmit signal 212.

In the proximity estimation process described above in FIG. 3, STAs 11 and 12 are not required to disregard quiet messages. Thus, in this case, the STAs 11 and 12 need not comprise controller 504. However, in this case, the portable device 13 would need to comprise such as controller to enable it to disregard quiet messages 302 and 310 so that it can transmit signals 304 and 312 during quiet intervals t3 and t4.

The AP 10 and STAs 11 and 12 may comprise a media output (406 and 506 respectively) for playing back media received at the Wi-Fi antenna (e.g. from portable device 13). The media outputs 406 and 506 may be, for example, an audio and/or visual output such as a speaker and/or display. The AP 10 and STAs 11 and 12 may also comprise one or more media inputs (not shown) which provide a connection to a media source (not shown) via a communication means other than Wi-Fi. For example, the media input may be a 3.5 mm input for auxiliary devices, a USB port, an Ethernet port, a connection to a DAB receiver, a Bluetooth transceiver, etc. The media inputted at the media input may outputted by media output 406 or 506 or sent over Wi-Fi to another device in the network 100 that has been selected for playing back media by the media controller 405.

In an example of a multi-speaker environment, AP 10 and STAs 11 and 12 may be wireless speakers. The AP 10 may be a softAP and STAs 11 and 12 may also have the capability to be a softAP. One of devices 10, 11 or 12 may be selected as a master speaker, which controls the operation of slave speakers. Preferably, the master speaker will be selected to operate as the soft AP. Thus the device 10, 11 or 12 that operates as the softAP can be changed.

Detecting a Predefined Power Pattern

As mentioned above, the measurement report 207, 215, 308, 316, 605 and/or 609 may comprise a RPI histogram report. The RPI histogram report is based on received interference power, such that samples of the received power are taken during a sampling time period, and the received power over the sample period is categorized as falling into one power "bucket". There are 8 buckets in the Wi-Fi standard. The number of samples falling into each bucket are counted to generate the histogram. The RPI histogram report can be utilised to estimate the proximity of transmitting or "interfering" devices to devices carrying out the RPI measurement.

In this example, the device transmits signals 204, 212, 304, 312, 602 and/or 607 (hereinafter referred to as the "interferer" device) in a stepped interference pattern. The interferer initially transmits at a first power level for a known time period, and then switches to a different power level. This generates two distinct spikes in the histogram of the RPI histogram report. The difference between the power levels controls the spacing between the spikes in the histogram. By finding the spikes in the histogram, a distance measure can be derived for comparison with other STAs. For example, this could be based on the mid-point between the spikes, or the "centre-of gravity" of the histogram values.

Figure 7:
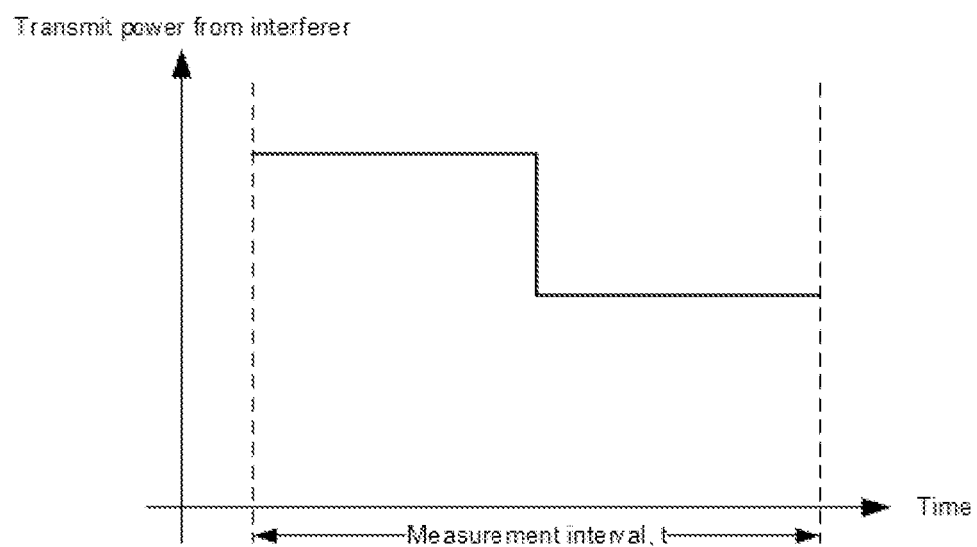
FIG. 7 is a chart showing an example power transmission pattern for an interfering signal.

For example, the chart shown in FIG. 7 shows an example type of signal that could be transmitted by the interferer that is disregarding the quiet message, and is deliberately interfering. This example shows the transmit power of an interfering signal initially at a first power for 50% of the measurement time period, and then switching to a second (lower) power for the remaining 50% of the measurement time period. Other examples could use different ratios of time for the power levels, or have a lower power first, or have more than 2 power levels.

The table below illustrates a simplified example of how this interference can be interpreted by the RPI histogram. The rows represent sampling periods of 100 μs at the measuring device, over a single measurement time period. The right-most 8 columns show the different power "buckets" of the RPI histogram report. The second column from the left shows the received interference power (in this example −77 dBm for the first 5 sampling periods, then −87 dBm for the last 5 sampling periods—i.e. reflective of the step function above).

| Time (μs) | Rx power (dBm) | RPI 0 P ≤ −87 | RPI 1 −87 < P ≤ −82 | RPI 2 −82 < P ≤ −77 | RPI 3 −77 < P ≤ −72 | RPI 4 −72 < P ≤ −67 | RPI 5 −67 < P ≤ −62 | RPI 6 −62 < P ≤ −57 | RPI 7 −57 < P |
|---|---|---|---|---|---|---|---|---|---|
| n | −77 | 0 | 0 | 100 | 0 | 0 | 0 | 0 | 0 |
| n + 100 | −77 | 0 | 0 | 100 | 0 | 0 | 0 | 0 | 0 |
| n + 200 | −77 | 0 | 0 | 100 | 0 | 0 | 0 | 0 | 0 |
| n + 300 | −77 | 0 | 0 | 100 | 0 | 0 | 0 | 0 | 0 |
| n + 400 | −77 | 0 | 0 | 100 | 0 | 0 | 0 | 0 | 0 |
| n + 500 | −87 | 100 | 0 | 0 | 0 | 0 | 0 | 0 | 0 |
| n + 600 | −87 | 100 | 0 | 0 | 0 | 0 | 0 | 0 | 0 |
| n + 700 | −87 | 100 | 0 | 0 | 0 | 0 | 0 | 0 | 0 |
| n + 800 | −87 | 100 | 0 | 0 | 0 | 0 | 0 | 0 | 0 |
| n + 900 | −87 | 100 | 0 | 0 | 0 | 0 | 0 | 0 | 0 |
| RPI Density: | | 128 | 0 | 128 | 0 | 0 | 0 | 0 | 0 |

As can be seen, the RPI histogram firstly records 5 sample periods (each of 100 μs) in RPI entry 2 (power bucket −82<P≤−77), and subsequently 5 sample periods (each of 100 μs) in RPI entry 0 (power bucket P=−87). The bottom row of the table shows an example of what may be seen in the RPI densities in the final measurement report. The RPI density represents the proportion of the overall measurement period that the received power was in each power bucket. This is represented in 8 bytes, with one byte per bucket and sums to approximately 255 (with some rounding errors) over all buckets. Therefore, if the received power was within one bucket for the whole measurement period, then the RPI density for this bucket would be 255 (the maximum representable in one byte) and the others would be zero. In the example above, the RPI density records zero in each RPI entry, except a value of 128 for both entry 0 and 2, corresponding to a 50-50 split of interference power in these two buckets. These are therefore the "spikes" in the histogram. A real system may not produce a report as clean as this, but there would still be detectable spikes. The spikes are of a matching size because the two power levels were transmitted for the same duration, and the spacing between the spikes is dependent on the relative sizes of the power levels.

Figure 8A:
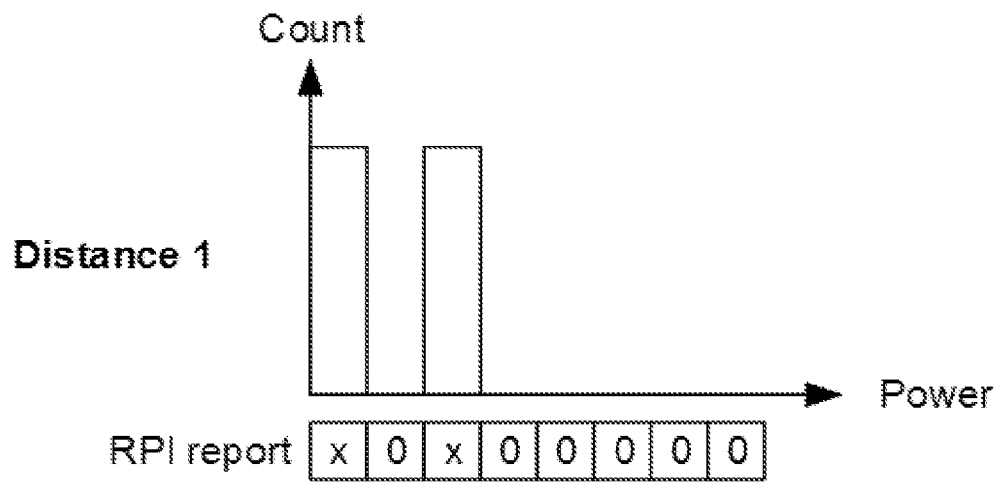
FIGS. 8a and 8b are example histograms from a received power indicator (RPI) report.
Figure 8B:
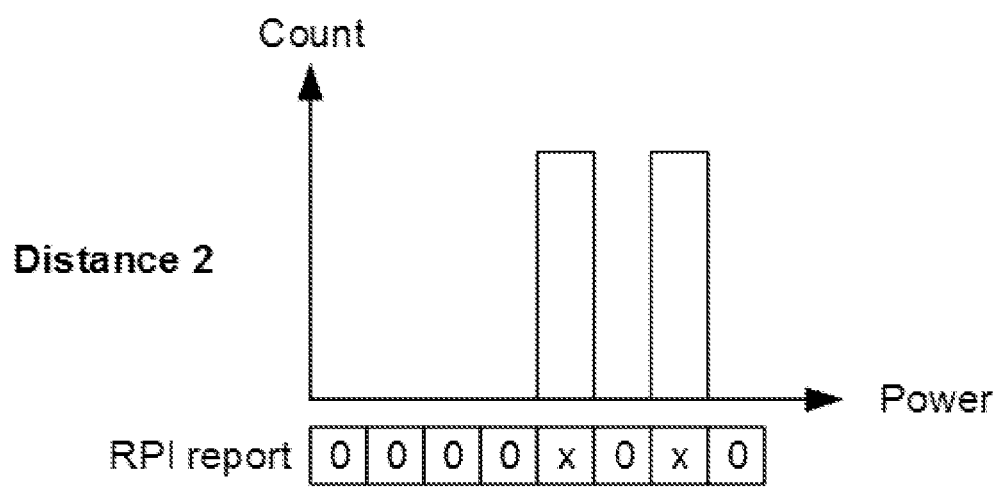

As an interferer gets closer or further away, the two spikes move left or right in the histogram report. For example, a far-away (i.e. low received power) interferer may give rise to an RPI report such as the one in the table above, as illustrated in FIG. 8a, in which the spikes indicate a low interference power. Conversely, a higher power (i.e. closer) interferer may give rise to an RPI report such as the one shown in FIG. 8b, in which the spikes indicate a high interference power.

The relative positions of the spikes for different interferers can be used as a measure of their relative distances away. For example, the "centre of gravity" of the RPI measurement report can be found and taken as the value used to compare interferers (e.g. this would obviously have the RPI value 1 in the table above). This would be similar to finding the mid-point between the two spikes in the absence of any noise or other interferers. However, any suitable comparison could be used (e.g. the position of the leftmost or rightmost spike).

The use of the two power levels (which causes the pair of spikes) gives a recognisable pattern that can be looked for in the histogram. It is possible to have only a single power level and look for a single peak in the histogram, but this may be more difficult to find in the presence of noise and other interferers. The two peak case is easier to find in a real system, as they are of a known height and spacing. Other interference issues could also be mitigated by performing measurements without the deliberate interference, and subtracting these from the result. Alternatively, multiple measurements can be taken and averaged.

Figure 9A:
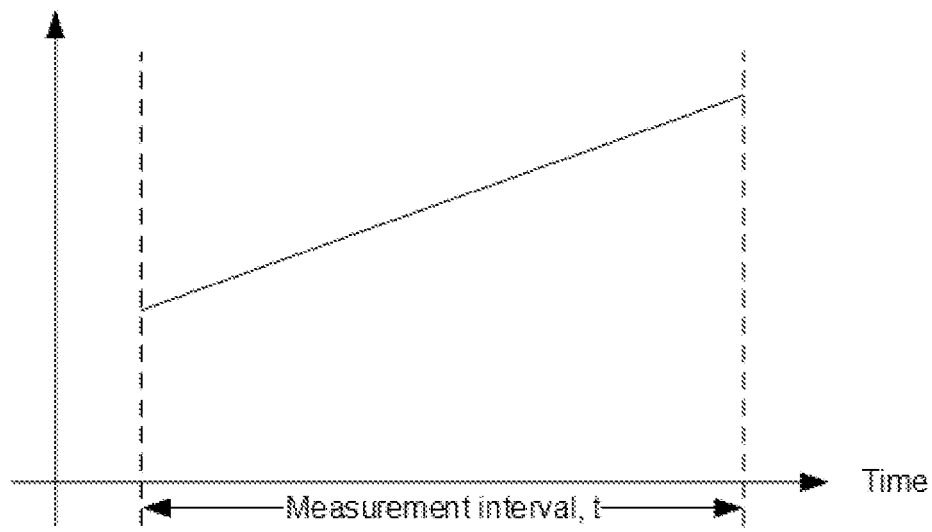
FIG. 9a is a chart showing an example power transmission pattern for an interfering signal.

In another example, the interferer may have a ramp interference pattern, as illustrated in FIG. 9a. This example shows the transmit power of an interfering signal ramping in a linear manner during the measurement period, t. In this case, the power starts at a non-zero value and is increased. Other examples could ramp down, start at zero, etc.

Figure 9B:
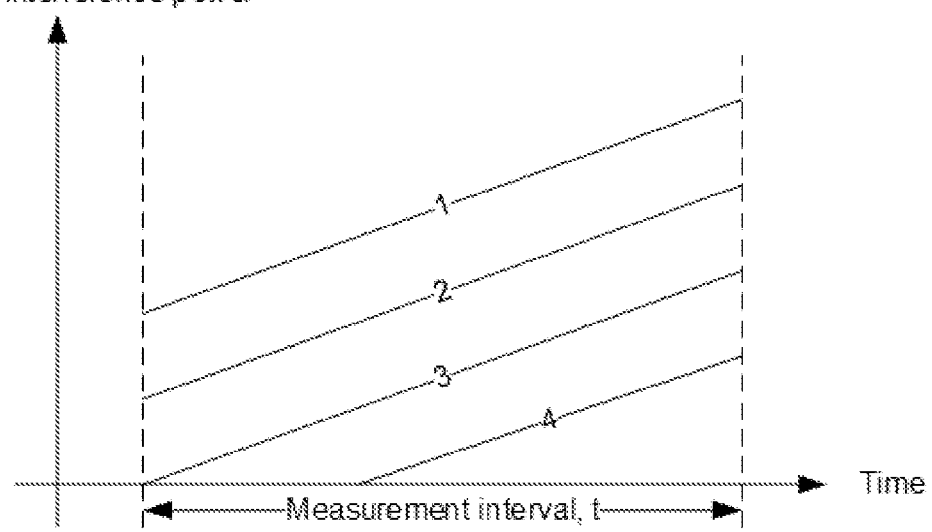
FIG. 9b is a chart showing measured received power at different distances.

FIG. 9b shows the received interference power, as measured by the device that is performing the standard Wi-Fi channel measurement. This chart shows four different received power profiles, each corresponding to the interferer being a different distance away—profile 1 being the closest, and 4 being the furthest away.

Generally, as the interferer gets further away, the received power profile has a proportionately lower magnitude, but the slope of the ramp stays broadly the same. Once the interferer is far enough away, some of the slope will disappear into the noise floor, as shown with profile 4.

By knowing the gradient of the ramp (the difference between the highest and lowest point), it can be determined how many buckets in the histogram the power ramp would cover. Furthermore, for a linear ramp, approximately the same proportion of the measurement period should be spent in each of the buckets covered by the ramp, meaning that the RPI density is approximately equal for each of these buckets.

Figure 10A:
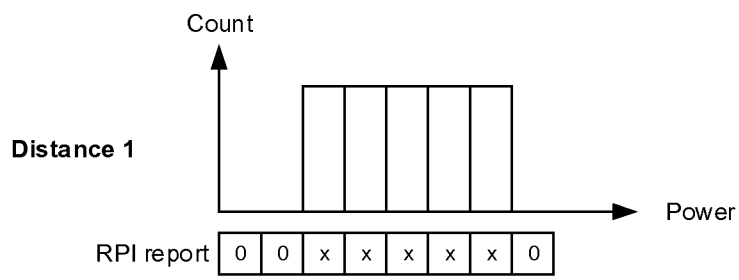
FIGS. 10a to 10d are example RPI histograms for the measured received power at the different distances of FIG. 9b.
Figure 10B:
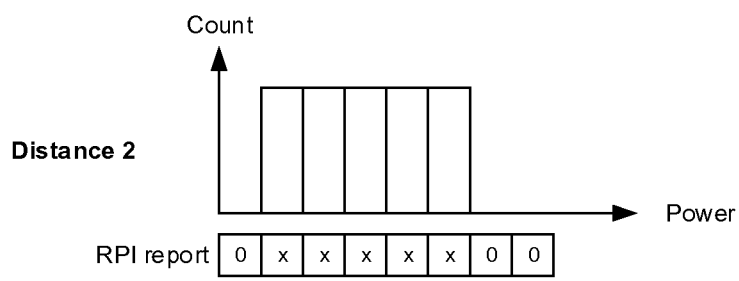
Figure 10C:
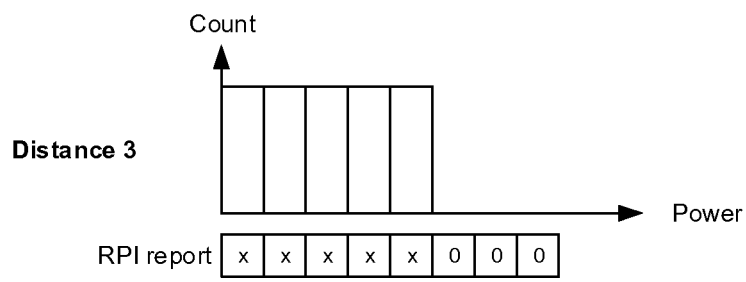
Figure 10D:
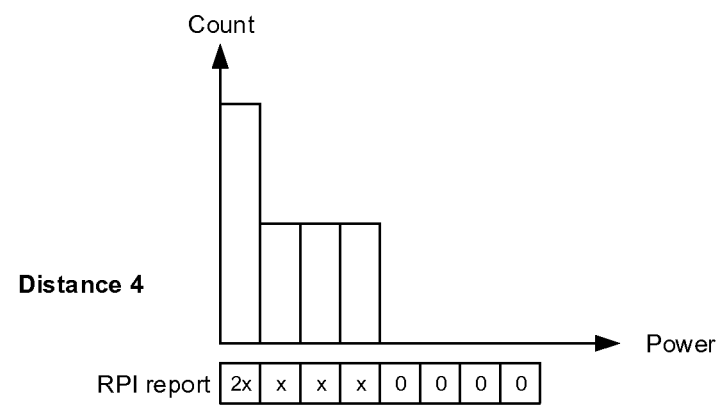

For example, for distance 1 in FIG. 9b, a strong interference is seen, implying the interferer is close by. This may result in the histogram shown in FIG. 10a. In this example, the ramp gradient is such that it covers 5 histogram buckets, which are seen towards the upper end of the histogram. The proportion of the measurement period with interference in each of these 5 buckets (i.e. the RPI density) is x, which in this example can be expected to be approximately 255/5=51. FIG. 10b shows the histogram for distance 2. The number of buckets with RPI density x is still 5, as the gradient is the same, but has moved down the histogram due the lower overall power. Similarly, the histogram for distance 3 in FIG. 10c shows the 5 buckets of x moving further down the histogram. In this case, the lowest received power is just at the noise floor, so the block of 5 xs reach the lowest power bucket of the histogram. For distance 4, a portion of the ramp has disappeared under the noise floor. This results in a histogram, as shown in FIG. 10d, containing only three buckets with an RPI density of x in them, and the lowest bucket has an RPI density of 2x. This is because, in this example, the time spent below the noise floor is counted into the lowest bucket, resulting in twice as much time with an interference value in the lowest bucket relative to the next three buckets.

The proximity of the interfering device can be estimated from the RPI histogram based on where the recognisable block of RPI densities are located in the histogram (e.g. the trailing edge, leading edge etc). The knowledge of what the RPI density should be in each bucket allow this to be extended even when the interferer goes below the noise floor—e.g. in the example described above it is known that there should be 5 buckets of x, so it can be determined how much of the interference is not seen, and the proximity determined accordingly.

In a real system, the results may not be as clean as this, and noise and other interference may affect the results, with more inconsistent RPI densities in the histogram. However, there would still be a recognisable pattern in the histogram. Other interference issues could also be mitigated by performing measurements without the deliberate interference, and subtracting these from the result. Alternatively, multiple measurements can be taken and averaged.

In the case that a higher resolution was needed than could be captured using the 8-entry histogram, then multiple measurements could be performed, with the interference ramp being split between the measurements (e.g. measurement 1 ramps between power A and B, measurement 2 ramps between power B and C with the same gradient, etc.).

As described herein, the proximity estimate is based on one or more signals being transmitted and received between one or more pairs of devices. Measured properties of the signal (such as signal strength, bit error rate, etc) can be indicative of a physical distance between the devices. Generally, from the point of transmission of the signal, the intensity of the signal decreases with increasing distance. Thus, certain properties of the signal will worsen with increasing distance. By measuring certain properties of the signal at a receiving device it is possible to estimate how near or far the receiving device is from the position that the signal was transmitted by the transmitting device. Thus, for example, a first measuring device that is a short distance away from a transmitting device can be considered to be more proximal to the transmitting device than a second measuring device that is a greater distance away from the transmitting device.

Furthermore, the rate at which the intensity of the transmitted signal decreases depends on the medium it is travelling through. For example, the signal can suffer from greater attenuation travelling through objects such as walls and ceilings/floors than travelling through air. Thus, in some cases, a transmitting device may be a short distance away from the receiving device but a wall may greatly attenuate the signal between the two devices leading to a signal that is worse than if the signal was travelling through only air. Thus, for example, a first measuring device in the same room as the transmitting device may be considered to be more proximal to the transmitting device than a second measuring device that is a shorter distance away but in another room as the second measuring device will receive a worse signal due to greater attenuation through a wall.

In the examples described herein, the received power of the transmitted signal is utilised as a way of determining the strength of the received signal to form the proximity measurements. However, the strength of the transmitted signal may be determined in other ways, such as signal quality, data rates, bit error rates, number of acknowledgements, etc. For example, the signal transmitted by the transmitting device during a quiet interval may be a sequence of frames, from which the measuring device can determine a data rate. The data rate measured by the measuring device can be reported to determine the strength of the signal received. The same sequence of frames may then be transmitted again so that a different pair of transmitting/measuring devices (one of which being the portable device) to determine another received data rate. The received data rates can then be collated and analysed to determine the proximity of the portable device to the AP 10 and/or STAs 11 and/or 12.

Similarly, in another example, the transmitting device may transmit a signal (during a quiet interval) comprising a number of frames addressed to the measuring device. In accordance with a communications protocol (e.g. Wi-Fi) the transmitted frames may require acknowledgements to be sent in response by the measuring device. The number of acknowledgements received back by the transmitting device can indicate the strength of the signal received at the measuring device. Similarly to above, for another pair of transmitting/measuring devices (one of which being the portable device), a similar signal may be transmitted with a similar number of frames addressed to the measuring device. The number of acknowledgements received by each measuring device can be used to form a measure of the proximity of the portable device to the AP 10 and/or STAs 11 and/or 12.

As mentioned above, the general principles described herein can be applied to devices and networks that operate according to communications protocols other than Wi-Fi, such as Bluetooth.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A method of estimating the proximity of a first device to a second device, the first and second devices capable of communicating according to a wireless communications protocol, the method comprising:
    at the first device, performing a channel quality measurement during a first period of time;
    at the first device, receiving a signal from the second device during at least a portion of the first period of time, the received signal having a power modulated according to a predefined pattern; and
    forming a measure of the proximity of the first device to the second device by analysing the power of the received signal so as to detect the predefined pattern.

2. A method as claimed in claim 1, wherein said forming step comprises analysing a histogram so as to detect a representation of the predefined pattern, wherein the histogram indicates received power at the first device.

3. A method as claimed in claim 2, wherein the wireless communications protocol is an IEEE 802.11 protocol and the histogram is a received power indicator (RPI) histogram defined by the IEEE 802.11 protocol.

4. A method as claimed in claim 1, wherein the channel quality measurement is, in accordance with the wireless communications protocol, for detecting interference.

5. A method as claimed in claim 1, wherein the wireless communications protocol is an IEEE 802.11 protocol and the channel quality measurement is a measurement defined by the IEEE 802.11 protocol.

6. A method as claimed in claim 1, further comprising the step of receiving a control message which, according to the wireless communications protocol, instructs the first device to perform the channel quality measurement during the first period of time.

7. A method as claimed in claim 1, further comprising the step of, at the first device, performing another channel quality measurement during another period of time, wherein said forming step is additionally dependent on said another channel quality measurement.

8. A method as claimed in claim 1, further comprising the steps of:
- at the second device, receiving an instruction to not transmit during the first period of time to enable the channel quality measurement to be performed by the first device during the first period of time; and
- at the second device, disregarding said instruction and transmitting the signal during the portion of the first period of time.

9. A first device for estimating the proximity of the first device to a second device, the first and second devices capable of communicating according to a wireless communications protocol, the first device comprising:
- a controller configured to cause the first device to perform a channel quality measurement during a first period of time;
- a transceiver configured to receive a signal from the second device during at least a portion of the first period of time, the received signal having a power modulated according to a predefined pattern; and
- a proximity estimator configured to form a measure of the proximity of the first device to the second device by analysing the power of the received signal so as to detect the predefined pattern.

10. A device as claimed in claim 9, wherein the proximity estimator is configured to analyse a histogram so as to detect a representation of the predefined pattern, wherein the histogram indicates received power at the first device.

11. A device as claimed in claim 10, wherein the wireless communications protocol is an IEEE 802.11 protocol and the histogram is a received power indicator (RPI) histogram defined by the IEEE 802.11 protocol.

12. A device as claimed in claim 9, wherein the channel quality measurement is, in accordance with the wireless communications protocol, for detecting interference.

13. A device as claimed in claim 9, wherein the wireless communications protocol is an IEEE 802.11 protocol and the channel quality measurement is a measurement defined by the IEEE 802.11 protocol.

14. A device as claimed in claim 9, wherein the transceiver is configured to receive a control message which, according to the wireless communications protocol, instructs the first device to perform the channel quality measurement during the first period of time.

15. A device as claimed in claim 9, wherein the controller is configured to cause the first device to perform another channel quality measurement during another period of time, wherein the proximity estimator is configured to form the measure of the proximity in dependence on said another channel quality measurement and the strength of the signal received at the first device.

16. A non-transitory computer readable storage medium having stored thereon computer executable instructions that when executed, cause at least one processor to:
- at a first device, perform a channel quality measurement during a first period of time;
- at the first device, receive a signal from a second device according to a wireless communication protocol during at least a portion of the first period of time, the received signal having a power modulated according to a predefined pattern; and
- form a measure of the proximity of the first device to the second device by analysing the power of the received signal so as to detect the predefined pattern.

* * * * *